(12) United States Patent
Ronkka et al.

(10) Patent No.: US 8,384,525 B2
(45) Date of Patent: Feb. 26, 2013

(54) CONTACTLESS PROGRAMMING AND TESTING OF MEMORY ELEMENTS

(75) Inventors: Risto Ronkka, Tampere (FI); Jukka Reunamaki, Tampere (FI)

(73) Assignee: Nokia Corporation, Espoo (FI)

( * ) Notice: Subject to any disclaimer, the term of this patent is extended or adjusted under 35 U.S.C. 154(b) by 914 days.

(21) Appl. No.: 12/300,497

(22) PCT Filed: May 15, 2006

(86) PCT No.: PCT/IB2006/001263
§ 371 (c)(1),
(2), (4) Date: Jun. 25, 2009

(87) PCT Pub. No.: WO2007/132282
PCT Pub. Date: Nov. 22, 2007

(65) Prior Publication Data
US 2009/0295548 A1   Dec. 3, 2009

(51) Int. Cl.
*H04Q 5/22* (2006.01)
*G08B 13/14* (2006.01)
*H04B 5/00* (2006.01)
*H04B 1/38* (2006.01)
*G06F 17/00* (2006.01)
*G06K 7/00* (2006.01)
*G11C 11/34* (2006.01)

(52) U.S. Cl. .......... 340/10.51; 340/572.1; 340/10.1; 340/5.61; 455/41.1; 455/557; 455/558; 235/375; 235/440; 365/185.04

(58) Field of Classification Search ........ 340/572.1, 340/572.4, 572.5, 988, 10.1, 10.2, 10.3, 10.31, 340/10.4, 10.41, 10.42, 825.69, 825.71, 825.73, 340/825.31, 825.72, 539, 825.32, 10.5, 5.61, 340/5.72; 235/375, 380, 382, 382.5, 451, 235/486, 492; 380/270, 271; 455/558, 41.1, 455/572, 41.2, 466, 419
See application file for complete search history.

(56) References Cited

U.S. PATENT DOCUMENTS
(Continued)

FOREIGN PATENT DOCUMENTS
CN   1572087 A   1/2005
CN   1662882     8/2005
(Continued)

OTHER PUBLICATIONS

Office Action dated Feb. 1, 2012 from European Application No. 06744702.9, 4 pages.
(Continued)

*Primary Examiner* — Jennifer Mehmood
*Assistant Examiner* — Mirza Alam
(74) *Attorney, Agent, or Firm* — Locke Lord LLP (57) ABSTRACT

The present invention provides a method for contactless programming of a memory element of an electronic device having a wireless short range communications interface. The method comprises performing an interrogation for detecting the presence of said wireless short range communications interface, receiving, responsive to said interrogation, data from said wireless interface, said data indicating a hardware configuration of said electronic device, selecting programming data for programming said memory element based on said hardware configuration, and transmitting said selected programming data to be received by said wireless short range communications interface. The method further comprises detecting an interrogation, transmitting, responsive to said interrogation, data via said wireless interface, said data indicating a hardware configuration of said electronic device, receiving programming data at said wireless short range communications interface, and programming said memory element according to said programming data. The invention also provides devices for performing the inventive method.

24 Claims, 5 Drawing Sheets

U.S. PATENT DOCUMENTS

| | | | | |
|---|---|---|---|---|
| 2002/0091456 | A1* | 7/2002 | O'Connor | 700/97 |
| 2002/0147027 | A1* | 10/2002 | Alford et al. | 455/557 |
| 2005/0125678 | A1* | 6/2005 | Shaw et al. | 713/185 |
| 2005/0176465 | A1* | 8/2005 | Fornell | 455/558 |
| 2005/0258229 | A1* | 11/2005 | Minemura | 235/375 |
| 2006/0113385 | A1* | 6/2006 | Chan et al. | 235/440 |
| 2007/0253251 | A1* | 11/2007 | Mizushima et al. | 365/185.04 |
| 2008/0162361 | A1* | 7/2008 | Sklovsky et al. | 705/65 |
| 2008/0190526 | A1* | 8/2008 | O'Shea | 150/147 |
| 2009/0075592 | A1* | 3/2009 | Nystrom et al. | 455/41.1 |
| 2009/0161872 | A1* | 6/2009 | O'Brien et al. | 380/271 |

FOREIGN PATENT DOCUMENTS

| | | | |
|---|---|---|---|
| EP | 1132800 | | 9/2001 |
| EP | 1437863 | | 7/2004 |
| EP | 1549100 | | 6/2005 |
| JP | 2001510315 | | 7/2001 |
| JP | 2003216450 | | 7/2003 |
| JP | 2004118344 | | 4/2004 |
| JP | 2004185235 | | 7/2004 |
| JP | 2004235713 | | 8/2004 |
| JP | 2005056150 | | 3/2005 |
| JP | 2005099908 | | 4/2005 |
| JP | 2005099909 | | 4/2005 |
| JP | 2005275891 | | 10/2005 |
| JP | 2005346611 | | 12/2005 |
| JP | 2006025160 | | 1/2006 |
| JP | 2006033552 | | 2/2006 |
| JP | 2006074588 | | 3/2006 |
| JP | 2006085637 | | 3/2006 |
| JP | 2006121731 | | 5/2006 |
| JP | 2007317170 A * | | 12/2007 |
| WO | WO9903288 | | 1/1999 |
| WO | WO 04/001589 | | 12/2003 |
| WO | WO2005053228 | | 6/2005 |
| WO | WO2005057316 | | 6/2005 |
| WO | WO2005114857 | | 12/2005 |
| WO | WO2006107515 | | 10/2006 |
| WO | WO 2007068993 A1 * | | 6/2007 |

OTHER PUBLICATIONS

Office Action dated Jan. 28, 2011 from Korean Application No. 10-2008-7025087, 7 pages.

International Search Report dated Feb. 22, 2007 from related PCT Application No. PCT/IB2006/001263, 4pgs.

International Preliminary Report on Patentability dated May 6, 2008 from related PCT Application No. PCT/IB2006/001263, 4pgs.

Office Action dated Mar. 16, 2011 from Chinese Application No. 200680054161.2, 19 pages.

File History for EP Application No. 06744702.9 as retrieved from the European Patent Office Electronic File System on Jul. 20, 2011, 63 pages.

Office Action and English translation thereof dated Aug. 2, 2011 from Japanese Application No. 2009-510560, 10 pages.

Office Action dated Jul. 28, 2010 from Korean Application No. 10-2008-7025087.

Office Action and English translation thereof dated Aug. 10, 2011 from Chinese Application No. 200680054161.2, 20 pages.

Nikolic et al., "Off-line programming of industrial robots by a personal computer", Industrial Electronics, Proceedings of the IEEE International Symposium on Athens, Greece, Jul. 10-14, 1995, pp. 677-682.

Roettger et al., "Bluetooth based Firmware flashing", IP.COM Journal, Nov. 14, 2002, pp. 1-2.

Office Action and English translation thereof dated Nov. 24, 2011 from Chinese Application No. 200680054161.2, 21 pages.

* cited by examiner

Fig. 5

CONTACTLESS PROGRAMMING AND TESTING OF MEMORY ELEMENTS

This invention is related to methods and devices for performing programming, configuring, debugging and/or testing of memory components in a contactless manner.

PRIOR ART

The manufacturing of a number of modern devices including electronic equipment, e.g. mobile terminals etc., requires permanent and/or temporary programming of memory components with certain information. This includes information like firmware, operating system, application software, market specific configuration data, logistics data and media content.

Current solutions for downloading software onto a device during manufacturing, e.g. flashing a flash ROM, are performed by using a mechanism that requires preliminary flashing algorithms to be present on the device, a physical connection and a connected power supply. The software download into products is conventionally performed in a programming station at the end of the manufacturing line after all components have been placed in the products. The software can also be re-programmed in later phases if the ROM is not a masked ROM. There exist also solutions where software is programmed onto memory chips in separate programming stations before a component is placed on the printed wiring board (PWB).

Another important task associated with device manufacturing is the testing/debugging. Such testing/debugging is usually performed using the JTAG (Joint Test Action Group) system. Product debugging via JTAG is typically done by connecting a physical four/five-pin interface.

However, all these conventional procedures entail certain disadvantages. The programming step can only be performed at a pre-defined time in the manufacturing process, which also applies to any kind of testing/debugging. In addition, the conventional approach requires that direct, i.e. wired connections are made, requiring special equipment, slowing down the manufacturing cycle due to the time required for establishing the contact. Furthermore no adaptations can be performed after the finished product is packaged, e.g. updating the firmware or like.

It is therefore an object of the invention to introduce a solution for programming software/data and/or debugging and testing devices during R&D and manufacturing more accurate, faster and much easier compared with conventional methods. Furthermore, the invention enables a reduction in the manufacturing cycle time and/or improves logistics flexibility. This invention also enables to reduce the need for physical connectors on electronics components/modules.

SUMMARY OF THE INVENTION

According to an aspect of the present invention a method is provided for contactless programming of a memory element of an electronic device having a wireless short range communications interface, comprising:
  performing an interrogation for detecting the presence of said wireless short range communications interface;
  receiving, responsive to said interrogation, data from said wireless interface, said data indicating a hardware configuration of said electronic device;
  selecting programming data for programming said memory element based on said hardware configuration; and
  transmitting said selected programming data to be received by said wireless short range communications interface.

The method according to the invention enables the replacement of direct physical connections for the programming of memory modules, e.g. during manufacturing of an electronic device or component. This provides improved flexibility, as the programming can be performed at any time and at any location within the manufacturing and logistics chain. The reduction or even omission of physical contacts can also improve immunity of the memory modules against electrostatic discharges. The wireless interface replacing the conventional direct connections can also be used later on for debugging/testing purposes, and even in the logistics channels for altering system software or likes without opening the package.

The contactless interface allows also recovering user data from a device in service or by user using RFID readers. Recovering is usually done when the user has purchased a new device and the old device is not operating normally. This malfunction is usually caused by some damaged component other than memory, e.g. if physical interface such as a pad connection is damaged by corrosion caused by humidity, and/or the program memory or file system is corrupted. Particularly embodiments wherein the power for performing this "data saving" procedure can be powered by the interrogation signal alone provide an improved reliability.

According to an exemplary embodiment the programming data are selected from the group comprising:
  firmware;
  operating system software;
  application software;
  logistics data;
  configuration data; and
  media content.

Media content can for example comprise pre-programmed content like screensavers, background images, themes, sounds, software download links and the like. Configuration data can e.g. comprise configuration data relating to a specific mobile service provider, manufacturer, distributor, corporate IT specific configuration, device clock settings, end user, or like. Logistic data can comprise delivery chain information such as location, temperature, humidity. The invention can also be used for replacing the shock indicator stickers indicating if a shipped product was exposed to mechanical shock or like. If a sensor like a mechanical shock sensor, temperature sensor or humidity sensor is provided within the electronic device, it is possible to determine if anywhere in the logistic chain the device was subjected to harmful conditions provide a corresponding indication. As the invention enables to provide such an arrangement within the product itself this can prevent any manipulation, e.g. by the shipping company.

According to another aspect of the present invention a method for contactless programming of a memory element of an electronic device having a wireless short range communications interface is provided, the method comprising:
  detecting an interrogation,
  transmitting, responsive to said interrogation, data via said wireless interface, said data indicating a hardware configuration of said electronic device;
  receiving programming data at said wireless short range communications interface; and
  programming said memory element according to said programming data.

The inventive method inter alia enables to "customize" electronic devices easily, by selecting the programming data based on the actual hardware configuration. The hardware configuration may e.g. include information about the camera type within a mobile phone, if a Bluetooth chip is present and other device-specific configuration data. The programming data can then be selected correspondingly.

According to an exemplary embodiment said programming data further include programming routines, and wherein said programming step is performed according to said programming routines. In this manner the actual programming routines, e.g. the flashing software, can be provided, thus improving the flexibility, as the programming routines do not need to be provided beforehand and in "static" conventional manner.

According to an exemplary embodiment the method further comprises:
  performing a testing procedure on said memory element and/or said electronic device; and
  transmitting results of said testing.

The invention also enables to replace the conventional direct connections for debugging/testing with the wireless interface. The wireless interface can internally connect with existing interfaces for this purpose, as the well known JTAG standard, or I²C or like.

According to an exemplary embodiment the method further comprises:
  receiving an interrogation signal;
  reading out data from said memory element; and
  transmitting said read out data via said wireless short range communications interface;
wherein said reading out and said transmitting is performed with power supplied by said interrogation signal.

This embodiment inter alia enables to "backup" data from a defective electronic device through the wireless short range communications interface. As it is very common that a device gets broken due to defects within the CPU/main controller, power supply or like, the information within the device (like address book entries and other personal information) can be saved with the present invention. In case of a defective power supply connection it will be required that the wireless short range communications interface (e.g. RFID) is adapted to provide enough power to perform the reading out of data.

According to an exemplary embodiment the method further comprises:
  denying further programming access via said short range communications interface to said memory module.

This is necessary to avoid any unauthorized or accidental tampering with the programmed content of the memory module later on.

According to an exemplary embodiment said denying step comprises:
  disabling an antenna of said short range communications interface;
  disabling said short range communications interface;
  disabling IC interfaces (JTAG, I²C, etc.); or
  disabling subsystems connected to said IC interfaces.

This provides an easy possibility for denying further access. The antenna can be disabled, either by completely detaching it, short circuiting or destroying the antenna structure, via soldering, laser cutting or other known methods. Or the entire wireless interface can be disabled or detached from the memory module. In the same manner IC interfaces like JTAG, I²C etc. may be disabled, as well as subsystems connected therewith.

According to an exemplary embodiment the method described above is used in manufacturing, logistics or service procedures of said electronic device. Replacing wired connections in manufacturing, logistics and service procedures in this manner offers an improved flexibility over conventional wire-based connections, for example in device replacement situations.

According to an exemplary embodiment the manufacturing comprises an assembly step of hardware components including said memory element, and wherein said method for programming said memory element is performed before, during or after said assembly step. The flexibility of performing the programming independent from the actual stage of the device assembly process can improve the production of devices with respect to required production time and also help save costs.

According to a further aspect of the present invention a computer program product is provided, comprising program code means stored on a computer readable medium for carrying out the method described above when said program product is run on a computer or network device.

According to yet another aspect of the present invention a device for contactless programming of a memory element of an electronic device having a wireless short range communications interface is provided, the device comprising:
  a second wireless short range communications interface;
  a data storage for storing programming data;
  a controller connected with said second wireless short range communications interface and said data storage;
wherein said controller is adapted for performing, via said second wireless short range communications interface, an interrogation for detecting the presence of said wireless short range communications interface, for receiving, responsive to said interrogation, data via said second wireless interface, said data indicating a hardware configuration of said electronic device, for selecting programming data from said data storage based on said hardware configuration, and for transmitting said selected programming data via said second wireless short range communications interface.

According to an exemplary embodiment said programming data are selected from the group comprising:
  firmware;
  operating system software;
  application software;
  logistic data;
  configuration data; and
  media content.

According to still another aspect of the present invention an electronic device is provided, comprising:
  a memory element;
  a wireless short range communication interface; and
  a controller;
wherein said controller is adapted for detecting an interrogation using said wireless short range communication interface, for transmitting, responsive to said interrogation, data via said wireless interface, said data indicating a hardware configuration of said electronic device, for receiving programming data at said wireless short range communications interface, and for programming said memory element according to said programming data. The controller may also be used to block IC interfaces or subsystems connect to IC interfaces as mentioned above.

According to an exemplary embodiment said programming data her include programming routines, and wherein said controller is further adapted for extracting said programming routines from said programming data and perform said programming according to said programming routines.

According to an exemplary embodiment said controller is adapted for performing a testing procedure on said memory element and/or said electronic device, and for transmitting results of said testing.

According to an exemplary embodiment said wireless short range communication interface is adapted for providing power to said controller for enabling operation thereof, the power being supplied to said wireless short range communication interface by an interrogation signal.

According to an exemplary embodiment said controller is adapted for denying further programming access via said short range communications interface to said memory element According to an exemplary embodiment said wireless short range communications interface comprises a detachable antenna.

According to an exemplary embodiment said wireless short range communications interface is adapted to be disabled, and said controller is adapted for disabling said wireless short range communications interface subsequent to a programming of said memory element.

According to an exemplary embodiment said IC interfaces or subsystems connected to said interfaces are adapted to be disabled, and said controller is adapted for performing said disabling of said IC interfaces or subsystems connected to said IC interface.

According to an exemplary embodiment said memory element is an electrically programmable memory component, selected e.g. from the group comprising:
 a flash ROM memory;
 an EEPROM memory;
 a fuse; and
 a RAM memory.

According to an exemplary embodiment said wireless short range communications interface is an RFID interface.

BRIEF DESCRIPTION OF THE DRAWINGS

The invention can be more fully understood by referring also to the attached drawings, which illustrate exemplary embodiments of the invention and which shall not be considered as limiting the present invention to the details thereof. In the drawings

DETAILED DESCRIPTION OF THE INVENTION

An RFID system generally comprises an interrogator (or sometimes called a reader) and one or more tags (or sometime called transponders). In addition to the reading capability the RFID interrogator may also act as a writer. In the ideal case the power which is needed to operate and read/write data to/from these tags is transferred from the interrogator to the tag via electromagnetic fields; therefore the tag can operate without its own power supply (e.g. battery). This kind of a system is called a passive RFID system and it usually requires a fairly constant power transfer from the interrogator. Another option is the use of semi-passive tags wherein power is supplied from its own power source, but the electromagnetic field generated by the interrogator is used for transferring data from the tag to the interrogator. Thus more energy can be reflected back (backscattering) to the interrogator, due to the fact that the energy is not needed for the tag. A third category comprises active RFID systems, wherein a tag uses its own power supply to power the chip and also for communication back to the interrogator.

Furthermore, RFID systems can be divided into two categories: near-field and far-field systems. In the near-field systems the distance is typically less than the wavelength/(2*pi) and in the far-field systems the reading distance is greater than that. In near-field systems typically inductive coupling is used, and in far-field system backscattering coupling is used. Far-field systems are usually operating at higher frequencies than near-field systems. Backscattering RFID systems operating at microwave frequencies (above 1 GHz) are usually using radar technology where electromagnetic waves are reflected by objects with dimensions that are larger than half of the wavelength. By changing antenna properties in the tag the properties of the reflected signal can be modified. This enables a communication from the tag back to the interrogator. However, usually a continuous carrier wave is used for communication, although in basic radar short pulses are utilized. Thus in passive and semi-passive systems the reflected signal must be separated from the carrier signal in the interrogator.

Most common RFID systems are designed so that they are most suitable for reading information from tags, e.g. identification codes. However in this case the most critical aspect is how fast and reliably the interrogator can write data to the tag. The power required for reading data from passive tags is much higher than the power needed to write something to a tag, due to the fact that the link loss is doubled. For example, at 2.45 GHz the link loss of 1 meter is roughly −40 dB in one direction (writing) and −80 dB in two directions (reading). Thus the writing speed can be much higher than the reading speed, at least over long distances.

Figure 1:
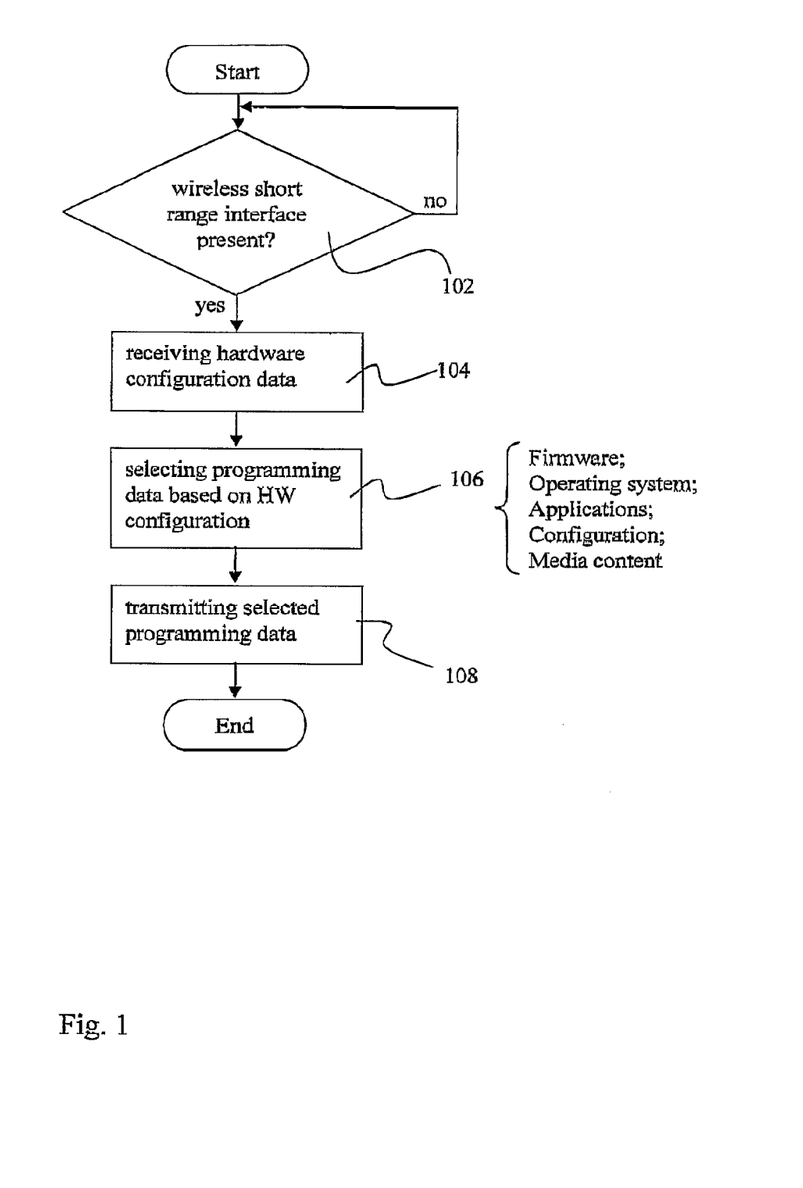
FIG. 1 illustrates a flow diagram of an embodiment of the method of the present invention, on the sending end.

FIG. 1 shows steps of an exemplary embodiment of the method of the present invention. In step 102 it is detected if there is a wireless short range interface present, that is, an interrogation step is performed. This step is repeated until a wireless short range interface is detected to be in range. Responsive to the interrogation data indicating the hardware configuration of an electronic device is received in step 104, for being enabled to determine the actual type of device comprising the wireless interface. Step 104 may optionally be preceded by an initial authentication step, wherein the device is being authenticated. This could for example be advantageous if products having the same hardware shall be customized in a certain way, e.g. based on some serial number. Also this is suitable for programming a variety of different devices with different hardware configurations on the same production line. For example a mobile phone can be pre-programmed by the invention with different language versions of its user interface (English, German, French etc.). The wireless interface could then provide the information which language version is desired for the current mobile phone to be programmed, e.g. based on a serial number of a specific hardware component.

Another example could be a line of mobile phones or PDAs or like, wherein some components are only optional. Components like a WLAN or Bluetooth transceiver or a camera may only be present in certain devices, although the rest of the hardware is identical. In this case the invention enables to program memory elements of such electronic devices only with drivers and/or related application software which are required in that particular model. In a device having a camera the image capture/manipulation/viewer drivers/programs are required, while they would only waste precious memory space otherwise.

Before programming a JTAG or I²C controller must configured, and prior thereto the actual chain structure of STAG must be known. In order to get this information a discovery process is made, according to the steps above. This allows determining the HW configuration of the system and furthermore it offers the possibility to download the right SW elements into the system.

Prior to step 104 an optional testing step (not shown) may be performed, wherein verification is made that all HW components in the system are working correctly. I.e. for example if the FLASH memory is connected correctly to the application ASIC, if all PINs are functioning in the right way etc. This step may also be performed by having temporary software uploaded to the device that will take care of doing such checks. This software could then be removed again, that is, overwritten by the actual programming data.

The method proceeds to step 106 where programming data are being selected according to the hardware configuration. Such programming data in the context of the present invention may comprise e.g. the above mentioned user interface localisation, or firmware, operating software, application software, device configuration and pre-programmed media content (example videos, screensavers, background images, software download links and the like). In the context of the present invention "programming data" shall not be restricted only to the actual payload data. In certain embodiments the programming data do furthermore include the required programming/flashing algorithms as well, which are the basis for being enabled to program the payload data. This provides an enormous flexibility, as these flashing algorithms must not be present in the device beforehand. In step 108 the selected programming data are sent to the electronic device, and the process of this embodiment terminates.

Figure 2:
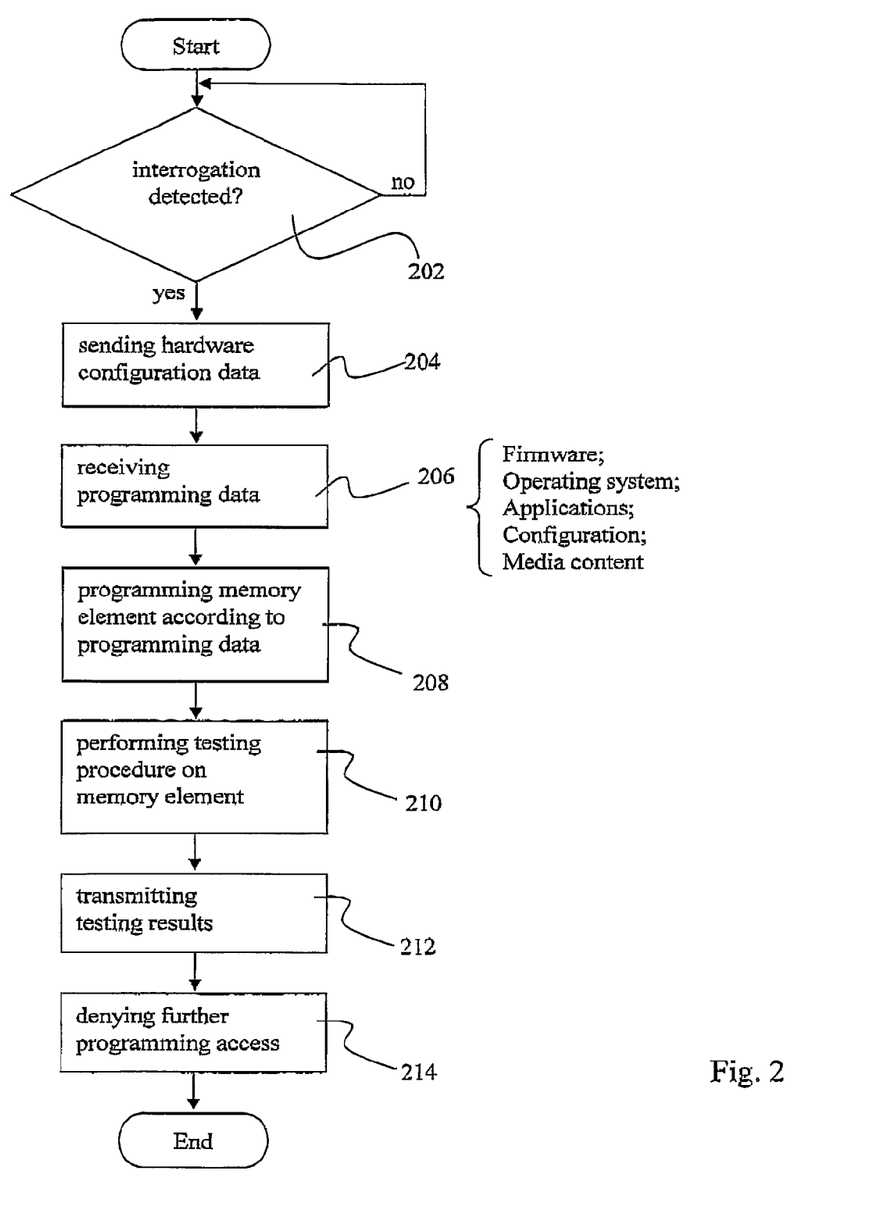
FIG. 2 illustrates a flow diagram of an embodiment of the method of the present invention, on the receiving end.

An embodiment on the receiving end is illustrated in FIG. 2. Responsive to a detection of an interrogation in step 202 data indicating the hardware configuration of an electronic device are sent in step 204, to be received at the sending end (corresponding to step 104 in FIG. 1). Step 204 may optionally be preceded by an initial authentication step, wherein the originator of the interrogation signal is being authenticated. Then programming data are received in step 206 (corresponding to step 108 in FIG. 1). In step 208 a memory element is programmed according to the received programming data. The next steps are optional steps of advanced embodiments. In step 210 a testing procedure is performed on the memory element. Results from this testing are transmitted in step 212. Finally, any further programming access to the memory element can be denied, in step 214.

The programming of memory modules within the device to be produced is performed in accordance with the programming data. That is, e.g. using the included programming algorithms, and in all cases the included payload data. In the (optional) step 210 the memory module can be tested/debugged e.g. using the very common JTAG interface that is part of many of such modules. The results of this testing/debugging procedure are then sent to analysis equipment, again using the wireless interface, in step 212. In this manner the testing/debugging is not dependent of physical contact with such analysis equipment, making this procedure more flexible, as it can now be performed anywhere and anytime that is suitable. Conventional methods require the testing to be performed in a testing site comprising the required apparatus for establishing physical contact with e.g. test pins on the memory module.

Finally, in step 214, which is also optional, further programming access to the flashed and tested memory module is denied. It should be apparent that this improves the security of the process, that is, prevents any unwanted tampering with the finalized memory module. Denying further access can be achieved by different means, will also be detailed later on. For example it is possible to simply detach the antenna of the wireless interface, or disable it by means of short circuiting or destroying of the antenna structure through soldering, laser cutting or the like.

An optional step to be performed instead of the above mentioned step 214 may include a security check for any received programming data before performing the programming with that data. This step would not require disabling the antenna in all use cases. Verification of the downloaded SW can be done by known SW authentication and security systems.

Figure 3:
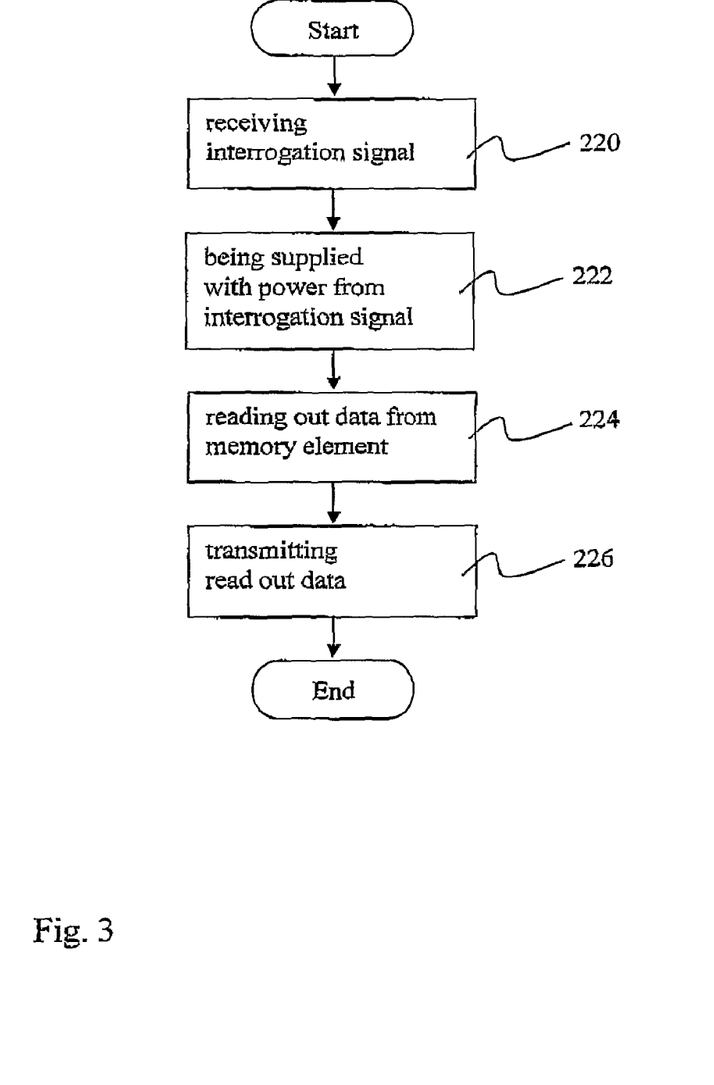
FIG. 3 illustrates a flow diagram of additional steps of an advanced embodiment of the method of the present invention, on the receiving end.

In FIG. 3 additional steps of another embodiment are shown. The process depicted here starts by receiving an interrogation signal in step 220. The signal may be used to provide the electrical power for actually performing the programming procedures explained above (step 222). This is particularly advantageous if an electronic device of a user has stopped working properly, e.g. the connection with the energy supply, Li-Ion battery or like, is broken. Using this embodiment it may then still be possible to read out some personal data of the user, like the phonebook content This reading out is performed in step 224, and the read out data can then be transmitted in step 226, enabling the user to save his data. It should be noted that the interrogation signal is to be understood in a broad sense, that is, it may be replaced by any other electromagnetic signal which is sufficient to provide enough power to the device. For that purpose other electromagnetic emitters may be used, like a WLAN transceiver or other radio device. The power can be provided by radiation as well as inductively. Providing the power in this wireless manner can be used in conjunction with other embodiments.

Figure 4:
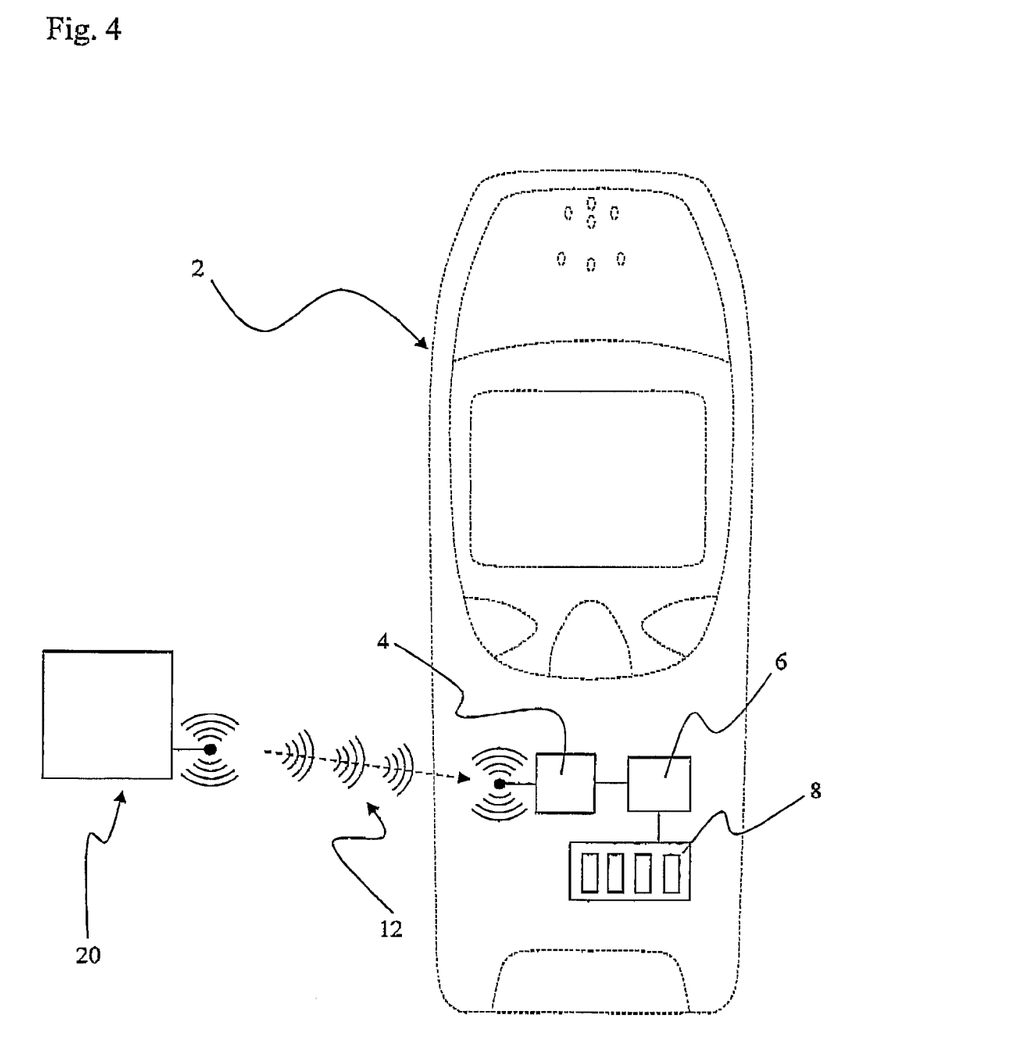
FIG. 4 depicts an embodiment of an electronic device according to an embodiment of the method of the present invention.

FIG. 4 depicts an exemplary embodiment of a memory module according to the present invention. Just as a non-restrictive example a mobile phone 2 is shown here, comprising a memory module according to the invention. The memory module comprises an RFID interface 4, a memory component 8, and a controller 6 connected with the wireless interface 4 and memory component 8.

The memory module built into the device 2 can be programmed/flashed via the RFID interface 4. An RFID writer device 20 can send programming data (indicated by 12) to the RFID interface 4. This may include only payload data to be programmed into the memory component 8, or in alternative embodiments also the algorithms required for performing the programming operation. That is, the programming data 12 may include e.g. flashing algorithms enabling the controller 6 to program the memory component 8 according to the payload data also included within the programming data. Although depicted here within a mobile electronic device 2 the inventive memory module can be used in conjunction with any other device. It can further be programmed even before being integrated into the respective device.

Figure 5:
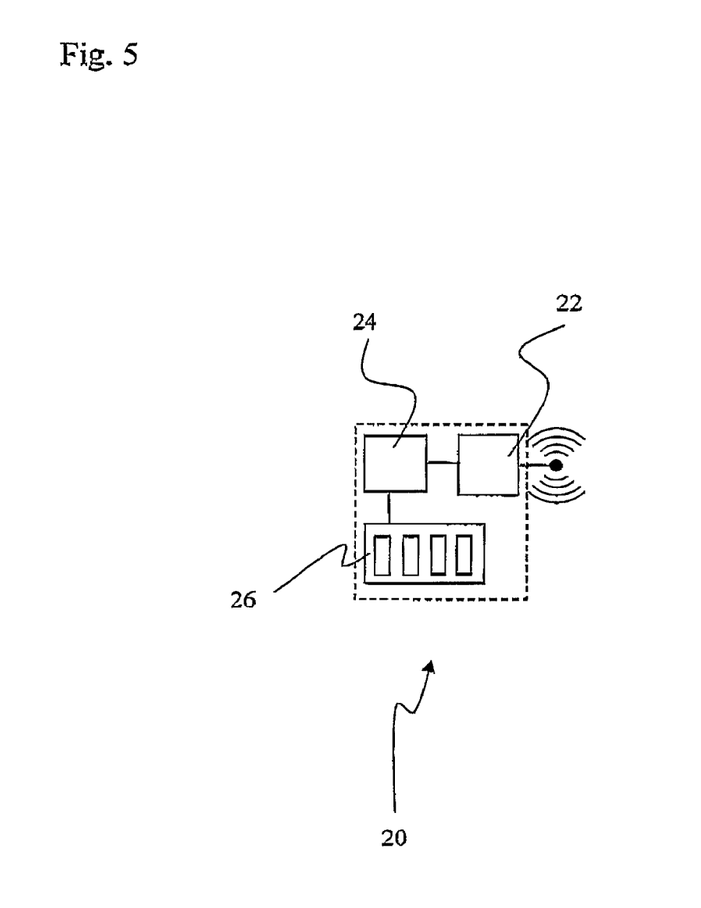
FIG. 5 depicts an embodiment of a device for programming the electronic device of FIG. 4, according to an embodiment of the method of the present invention.

In the latter case there exists an easy possibility to have the RFID 4 interface disabled, e.g. by detaching the antenna, or by disconnecting the RFID interface 4 from the controller. In this manner a further programming access to the memory component 8 can be prevented, e.g. in order to avoid any unauthorized tampering with the data content of the memory component 8. This avoiding of unauthorized manipulation may in other embodiments also be performed by disabling IC interfaces (JTAG, I²C, etc.), or by disabling subsystems connected to said IC interfaces, In FIG. 5 an embodiment of the RFID writer device 20 according to the invention is illustrated. It comprises a second wireless interface 22, a data storage 26 for storing programming data, and a controller 24 connected with the wireless interface 22 and the data storage 26. The components can be integrated into a single device as indicated by the dashed box. In other embodiments the data storage 26 can be an external data storage, e.g. a data bank connected through a network.

The invention is related to a use of RFID technology to replace physical connections in R&D, mass manufacturing, logistics and maintenance/service phases. The major feature of the invention is to use RFID for flashing memory components and/or testing/debugging devices during manufacturing without the need to establish a physical contact. This may occur for example during the following manufacturing or logistics phases: before the memory is placed on the package (PWB, SIP, SOP), before the package is placed on the carrier, while the carrier is rotated on the roll, while the component roll is placed on a placement machine, before or during memory is placed on the product to be manufactured, in the component placement phase (CMT), molding phase, interconnection phase (reflow, inkjet integrated), during the connection of the memory to the rest of the system, curing & reflow, packaging, packet collection, transportation, etc. or later in logistics channels (without opening the package).

The invention can be used to provide a connection to internal product interfaces such as JTAG, I²C, I/O pins, memory and data buses, CPU registers, cameras, display interfaces or interfaces for powering on I/O cells. In this manner the conventionally required direct physical connections can be replaced by an RFID interface, which provides more flexibility. It also makes the manufacturing process more flexible as the flashing operation is not limited to a certain process step at a certain physical location. Another advantage to be obtained with the present invention can be an improved immunity against electrostatic discharges, in case physical connectors can be reduced or avoided altogether. Means for dealing with such electrostatic discharges could then be omitted, which can further improve the production process.

One use case could be manufacturing of devices such as mobile phones, memory cards and SIM cards. During the manufacturing process the (external) RFID reader reads out device information, e.g. the type/model of the mobile phone to be produced, and then uploads data to the phone according to what is desired. This data can include firmware, operating system software, application software, default media content and the like.

A major feature of the invention is to program the memory of a device during a manufacturing process or in logistics channels. In the following some examples of the process are given:

Before and during the assembly of the memory module or mounting it on the PWB, before or during SMT, before or after reflow etc. The first option is that programming can be done before assembling the memory to the PWB. The (RFID) tag chip can be arranged inside the memory, as well as the antenna. Another option is that the antenna is integrated into the reel where the memory is delivered and thus the antenna is removed before assembly. In this case the memory cannot be re-flashed without physical contact if final devices do not include an antenna for the chip. If re-flashing via RFID is made impossible in this manner, security is improved.

The procedure can be executed also after assembly, in logistics channels (without opening the package) and after purchase. The tag can be arranged inside the memory chip or integrated to some other chip that is capable of programming the memory. The antenna can be inside the memory chip, an external component or integrated into some other component. For example, the antenna can be printed either into the silicon die package or it can be printed on the substrate. There can be an option that the RFID tag can be used only once to write data into the memory, and then it will be locked and flashing can only be done via a physical interface. In addition to receiving energy via the RFID interrogation signal, the tag may get all or part of the necessary energy for example from a back-up battery, thus it can be a passive, semi-passive or active tag.

One option to implement programming functionality is that the external RFID reader powers the wireless programming and debugging subsystem (RFID-WPD) on the device, the RFID-WPD subsystem then detects the existence of the interfaces on the device. In next step a combined RFID JTAG service will be established. Subsequently the external control system can power on other chips on the device, read and write data using JTAG protocols on top of RFID radio protocols. The necessary power can be received via RFID interrogation signal, from main battery or some other power source. After RFID JTAG connection service exists, information about components on device is delivered to the external control system. The external control system delivers the required programming (e.g. flashing) algorithms to subsystem X and starts sending the payload data to be programmed. Subsystem X then starts programming memory components on the product. In this manner the need for having preliminary flashing algorithms on the device already is eliminated, enabling more flexibility and possibly reducing the cycle time in the production.

In a case where RFID-WPD subsystem is connected and integrated directly into memory chip direct access to memory blocks can be established via the combined RFID JTAG system or using some other interface on module. In addition to uploading the data to the memory, the RFID can be also be directly connected to the JTAG chain of an Application Specific Circuit (ASIC) to allow testing and/or programming of the functionality of the ASIC without physical contact to the chip.

The RFID technology for example can be a 13 MHz RFID standard that can provide e.g. 424 Kbit of transfer rate, but may as well be a 2.45 GHz RFID standard, depending on which one is most suitable for the desired system characteristic. For example at higher frequencies more data rate is possible, but power transfer is more difficult.

Power can be supplied also by using some other radiation or magnetic induction method. The RFID tag may be passive, semi-passive or active. Radio devices being part of the electronic device to be produced, such as GSM, WCDMA, CDMA, UWB, WLAN, can also be used for this purpose, i.e. for providing the electromagnetic energy to power the RFID tag, if they can be powered up during the process.

The invention can also be applied to a device with an integrated RFID reader/communication module, that is, a device already having an integrated RFID interface, which is a likely feature of future mobile devices etc. Memory devices present within this electronic device, e.g. mobile phone, can then be flashed according to the techniques presented in this invention. In order to provide the flashing, the device needs to have power that can be provided by an attached battery, e.g. the main battery of the mobile phone. For future RFID systems it may even be possible to power this operation entirely through the RFID interface (by the interrogation signal).

After the device is flashed and tested, wherein the flashing may be a pre-process of the testing of the RFID interface or like, as this testing will require power anyway, the memory will be "cut off", e.g. disconnected from the RFID interface, such that no flashing of the device over the REID interface can be performed anymore. It should be apparent that preventing further flashing of internal memory components of a device must be possible.

It should be noted that the invention described above it not to be limited to mobile terminals or like. The invention can also be applied in connection with other types of products comprising an RFID interface, such as for example future cars or like having an RFID communication module for e.g. detecting a driver and/or mobile devices within the car for automatically adapting the car settings to correspond to the situation.

The invention claimed is:

1. Method, comprising:
   transmitting an interrogation signal for providing power to a passive wireless short range communications interface of an electronic device having a memory element, for triggering said passive wireless short range communications interface to respond to said interrogation signal;
   receiving, responsive to said interrogation signal, data from said passive wireless short range communications interface, said data including at least information about a hardware configuration of said electronic device;
   selecting programming data for programming said memory element based on said hardware configuration; and
   transmitting said selected programming data to be received by said wireless short range communications interface.

2. Method according to claim 1, wherein said programming data are selected from the group comprising:
   firmware;
   operating system software;
   application software;
   logistic data;
   configuration data; and
   media content.

3. Method, comprising:
   receiving power from an interrogation signal at a passive wireless short range communications interface of an electronic device having a memory element;
   transmitting, responsive to said interrogation signal, data via said passive wireless short range communications interface, said data including at least information about a hardware configuration of said electronic device;
   receiving programming data at said passive wireless short range communications interface;
   programming said memory element according to said programming data; and
   wherein said power supplied by said interrogation signal is used for transmitting, said receiving and said programming are performed.

4. Method according to claim 3, wherein said programming data further include programming routines, and wherein said programming step is performed according to said programming routines.

5. Method according to claim 3, further comprising:
   performing a testing procedure on said memory element and/or said electronic device; and
   transmitting results of said testing via said passive wireless short range communications interface.

6. Method according to claim 3, further comprising:
   receiving an interrogation signal;
   reading out data from said memory element; and
   transmitting said read out data via said wireless short range communications interface;
   wherein said reading out and said transmitting is performed with power supplied by said interrogation signal.

7. Method according to claim 3, further comprising denying further programming access via said short range communications interface to said memory element.

8. Method according to claim 7, wherein said wireless short range communications interface comprises an antenna, and wherein said denying comprises disabling said antenna.

9. Method according to claim 7, wherein said denying comprises disabling said wireless short range communications interface.

10. Method according to claim 7, wherein said denying comprises:
    disabling IC interfaces connected to said wireless short range communications interface; or
    disabling subsystems connected to said IC interfaces.

11. Method according to claim 1, used in manufacturing, logistics or service procedures of said electronic device.

12. Method according to claim 11, wherein said manufacturing of said electronic device comprises assembling of hardware components including said memory element, and wherein said method is performed before, during or after said assembly step.

13. Computer program product comprising program code means stored on a non-transitory computer readable medium for carrying out the method of claim 1 when said program product is run on a computer or network device.

14. Device, comprising:
    a wireless short range communications interface;
    a data storage for storing programming data;
    a controller connected with said wireless short range communications interface and said data storage;
    wherein said controller is adapted for transmitting, via said wireless short range communications interface, an interrogation signal for providing power to a passive wireless short range communications interface of an electronic device having a programmable memory element, for triggering said passive wireless short range communications interface to respond to said interrogation signal, for receiving, responsive to said interrogation, data via said wireless interface, said data including at least information about a hardware configuration of said electronic device, for selecting programming data from said data storage based on said hardware configuration, and for transmitting said selected programming data via said wireless short range communications interface.

15. Device according to claim 14, wherein said programming data are selected from the group comprising:
    firmware;
    operating system software;
    application software;
    logistic data;
    configuration data; and
    media content.

16. Electronic device, comprising:
    a memory element;
    a passive wireless short range communication interface adapted for receiving an interrogation signal; and
    a controller;
    wherein said passive wireless short range communication interface is adapted for providing power to said controller for enabling operation thereof, the power being supplied to said passive wireless short range communication interface by said interrogation signal; and wherein said controller is adapted for transmitting, responsive to said interrogation, data via said wireless interface, said data including at least information about a hardware configuration of said electronic device, for receiving programming data at said passive wireless short range communications interface, and for programming said memory element according to said programming data.

17. Device according to claim 16, wherein said programming data further include programming routines, and wherein said controller is further adapted for extracting said programming routines from said programming data and perform said programming according to said programming routines.

18. Device according to claim 16, wherein said controller is adapted for performing a testing procedure on said memory element and/or said electronic device, and for transmitting results of said testing.

19. Device according to claim 16, wherein said controller is adapted for denying further programming access via said short range communications interface to said memory element.

20. Device according to claim 16, wherein said wireless short range communications interface comprises a detachable antenna.

21. Device according to claim 16, wherein said wireless short range communications interface is adapted to be disabled, and wherein said controller is adapted for disabling said wireless short range communications interface subsequent to a programming of said memory element.

22. Device according to claim 21, wherein said device comprises IC interfaces connected to said wireless short range communications interface and subsystems connected to said IC interfaces, and wherein said controller is adapted for performing said denying by disabling said IC interfaces or said subsystems.

23. Device according to claim 16, wherein said memory element is selected from the group comprising:
a flash ROM memory;
an EEPROM memory;
a logic register;
a fuse; and
a RAM memory.

24. Device according to claim 16, wherein said passive wireless short range communications interface is an RFID interface.

* * * * *